June 17, 1952 — F. O. CHURCH — 2,600,847
TIRE GAUGE
Filed Oct. 29, 1947 — 6 Sheets-Sheet 1
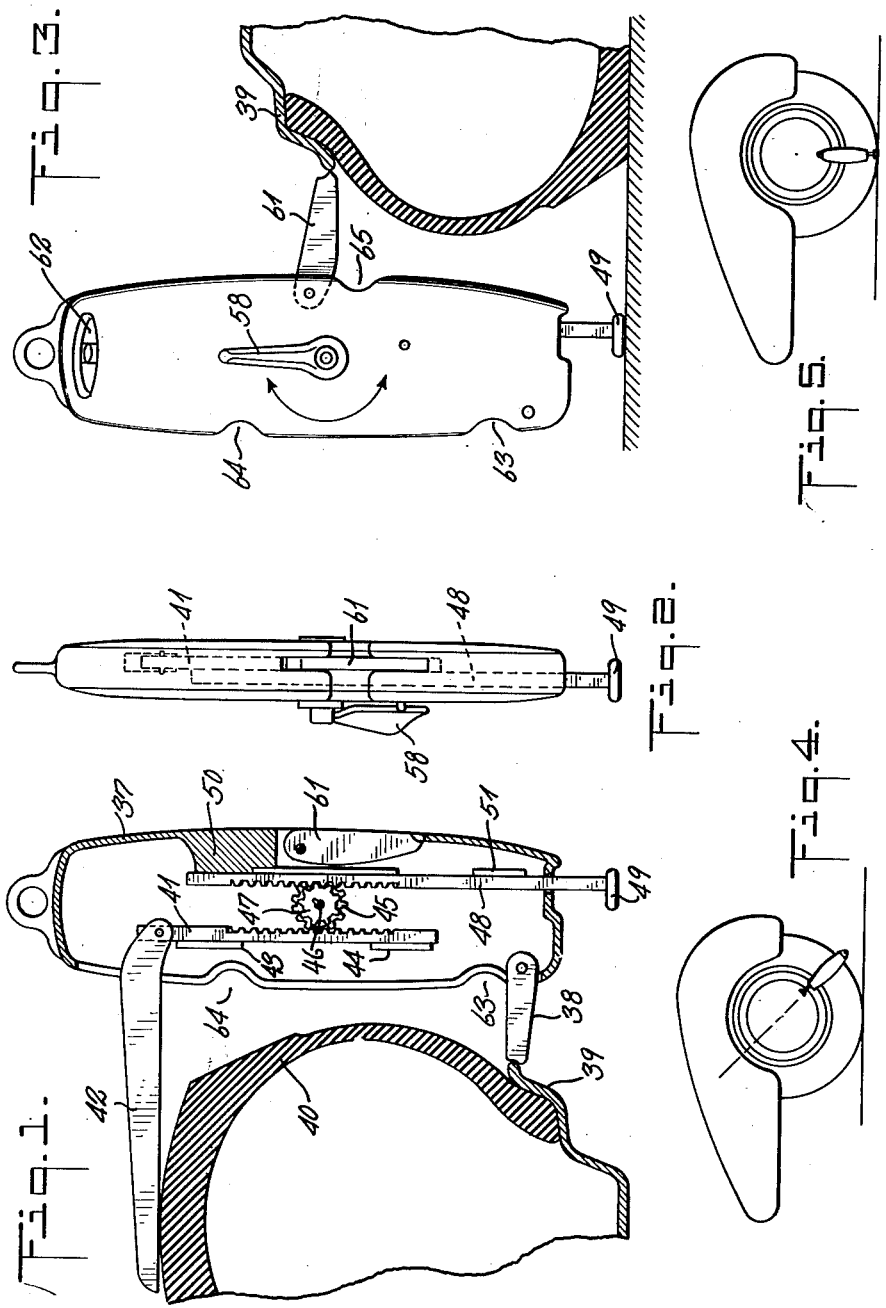
INVENTOR.
Franklin O. Church
BY Benj. T. Rauber
ATTORNEY June 17, 1952  F. O. CHURCH  2,600,847
TIRE GAUGE Filed Oct. 29, 1947  6 Sheets-Sheet 2

INVENTOR.
Franklin O. Church
BY
Benj. T. Rauber
ATTORNEY

June 17, 1952　　　　　　　F. O. CHURCH　　　　　　　2,600,847
TIRE GAUGE

Filed Oct. 29, 1947　　　　　　　　　　　　　　　　6 Sheets-Sheet 3

INVENTOR.
Franklin O. Church
BY
Benj. T. Rauber
ATTORNEY

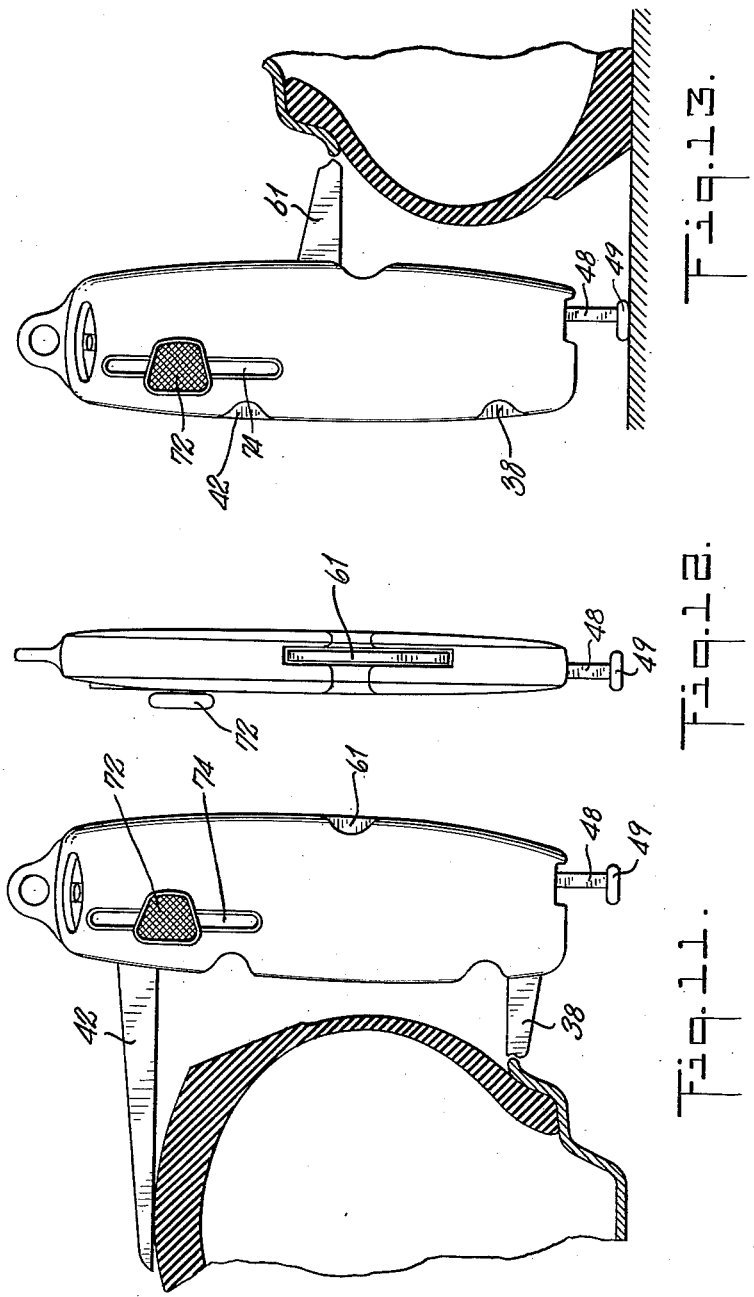

June 17, 1952   F. O. CHURCH   2,600,847
TIRE GAUGE
Filed Oct. 29, 1947   6 Sheets-Sheet 5
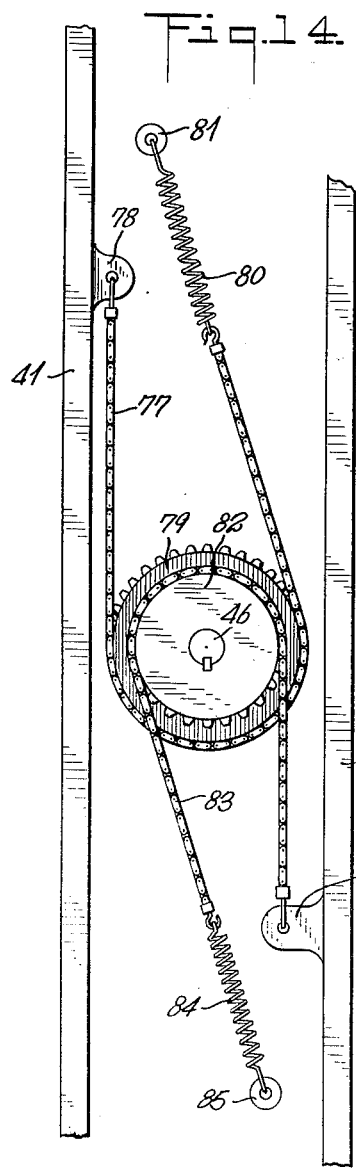
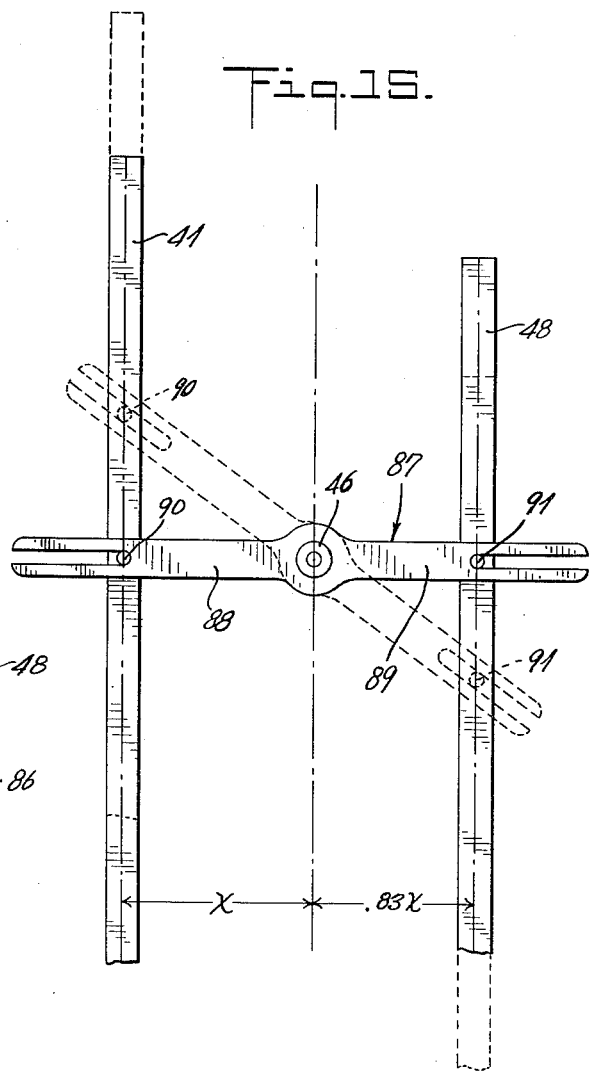
INVENTOR.
Franklin O. Church
BY
Benj. T. Rauber
ATTORNEY

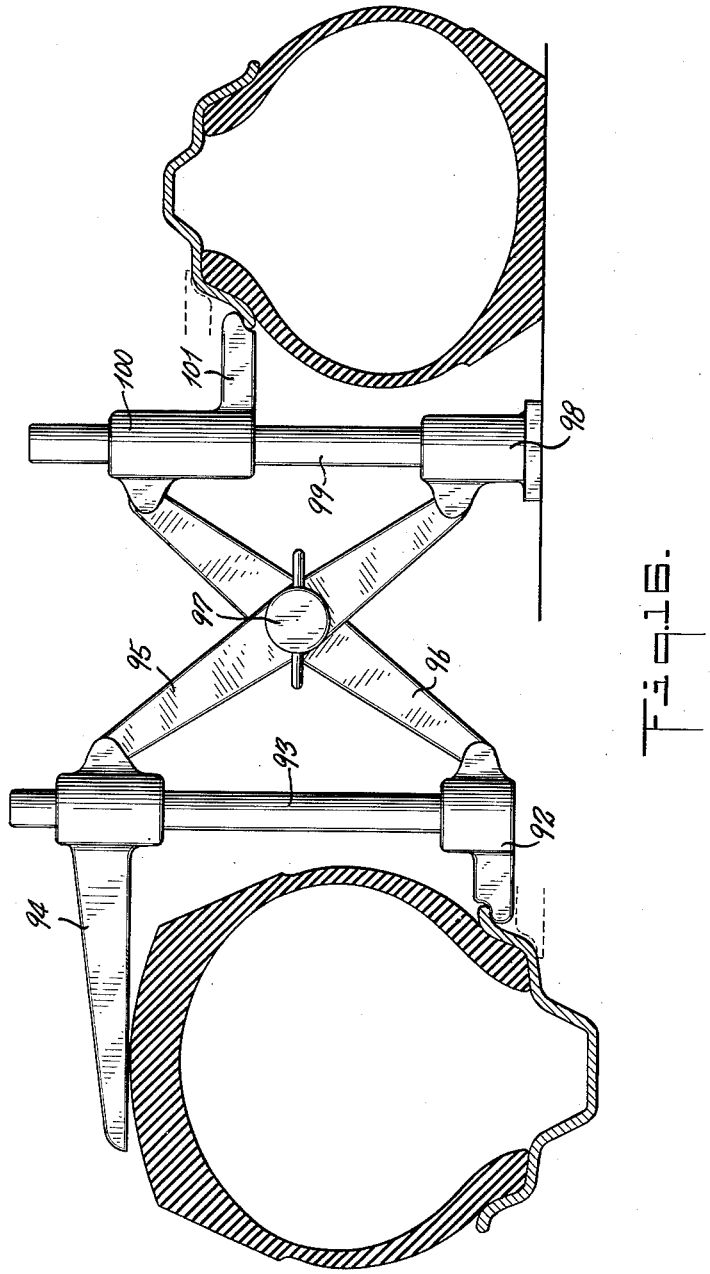

Patented June 17, 1952

2,600,847

UNITED STATES PATENT OFFICE 2,600,847

TIRE GAUGE

Franklin O. Church, Buffalo, N. Y., assignor to Dunlop Tire and Rubber Corporation, Buffalo, N. Y., a corporation of New York Application October 29, 1947, Serial No. 782,836

5 Claims. (Cl. 33—169)

My present invention relates to a tire gauge. Heretofore to determine whether a tire has been properly inflated its pressure has been measured by a pressure gauge attached to the filling valve stem. This method of determining the inflation condition of the tire suffers from the disadvantages that the pressure does not under varying conditions of operation or loading of the tire indicate whether it is inflated to give the proper amount of deflection, and also that the gauges themselves may become inaccurate due to careless handling, rust, dirt, changes in the resistance or stiffness of the spring which measures the pressure, and to inaccurate application of the tire gauge to the filling stem.

These inaccuracies are eliminated or avoided in my present invention in which the deflection of the tire under load is indicated with reference to the deflection required for an optimum service.

Pneumatic tires are designed to give best service when deflected under load to a predetermined percentage of their undeflected inflated sectional height. This percentage is generally about 85% of the sectional height of the tire when fully inflated and not under load. Or the tire may give its best service when the distance from the outermost edge of the tire rim to the level of the flattened or deflected surface of the tire is about 83% of the distance from the outer edge of the tire rim to the undeflected outermost surface of the tread.

The tire gauge of my present invention measures this distance from a fixed part of the rim as, for example, from the outermost edge to the level surface on which the loaded tire is supported and indicates whether the tire is over inflated or under inflated, whereupon it may be brought by the admission or escape of air to the proper inflation.

The various features of my invention are illustrated by way of example in the accompanying drawings in which Fig. 1 is a longitudinal sectional view of a tire gauge of my invention adjustable for tires of different sizes and showing the gauge in position to set it for a specific tire size;

Fig. 2 is a side view of the gauge taken from the right of Fig. 1;

Fig. 3 is a side view of the invention in position to measure the deflection of the tire;

Figs. 4 and 5 are side views on a smaller scale showing the positions of the tire gauge in measuring the undeflected dimension and deflected dimension of the tire;

Figs. 11, 12 and 13 are views similar to those of Figs. 1, 2 and 3 of a modified form of tire gauge;

Figs. 14 and 15 are detail views of modified forms of differential actuating mechanism forming a part of the gauge shown in Figs. 1 to 13, and Fig. 16 is an elevation of a still different modification of a tire gauge shown in position both to measure the undeflected dimension and the deflected dimension of a tire, the tire being shown in cross-section.

Figure 6:
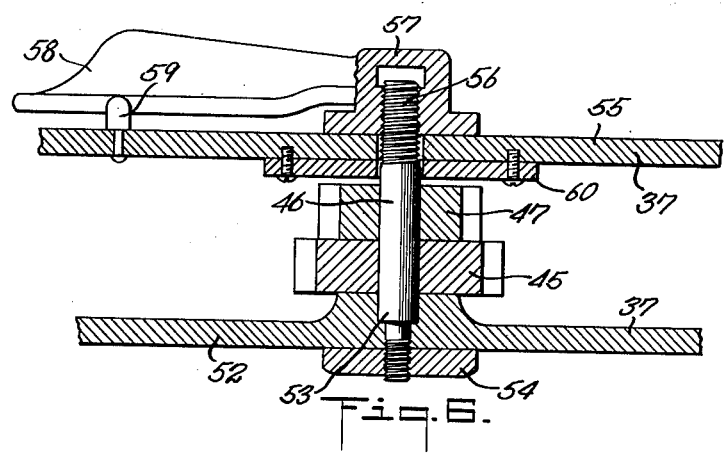
Figs. 6 and 7 are sectional views at right angles to the section of Fig. 1 of a mechanism for locking the gauge in adjusted or set position, Fig. 6 indicating it in its unlocked and Fig. 7 in its locked position.

As shown in Figs. 1 to 3, the gauge comprises a case or housing 37 having a pivoted arm 38 which may be swung to and locked in position at right angles to the lengthwise dimension of the case 37 and is provided with a suitable notch to engage the outturned edge of a tire rim 39 on which a pneumatic tire 40 is mounted.

Similarly pivoted to a sliding rack bar 41 is an outwardly extending arm 42 which may be brought into contact with the outermost surface of the tire tread, as shown in Fig. 1, by moving the arm 42 and the rack bar 41 which slides in suitable guides 43 and 44.

The movement of the rack bar 41 and arm 42 relative to the arm 38 is transferred at a reduced rate to an indicating mechanism for measuring the dimension of the deflected part of the tire. This transmitting mechanism comprises a gear or pinion 45 loosely mounted on a stationary shaft 46 and fixed to a pinion 47 of smaller pitch diameter so that the two rotate at equal angular velocities. The pinion 47 in turn meshes with a rack bar 48 having a foot portion 49 extending out of the case 37. The bar 48 is slidably mounted in suitable guides 50 and 51.

It will be apparent that when the arm 38 engages the edge of the rim 39 and the arm 42 is brought into contact with the tread portion of the tire 40, as shown in Fig. 1, the bar 41 will be moved accordingly and will move the rack bar or rod 48 a corresponding distance depending upon the pitch diameters of the pinions 45 and 47. The diameters of these pinions may be so selected that the movement of the rod 48 will be in such relation to the casing as corresponds to the flattened dimension of the tire when it is flexed to the optimum extent as, for example, to about 83%. This would correspond to a pinion, 45, having twenty-four teeth and pinion, 47, having twenty teeth so that the rod 48 would move about five-sixths the distance of the rod 41 when adjustment is made to the full tire in an undeflected part.

When this adjustment has been made the pinions 45 and 47 are locked relative to the case. This locking may be accomplished by any suitable mechanism as shown for example in Figs. 6, 7 and 8.

Figure 7:
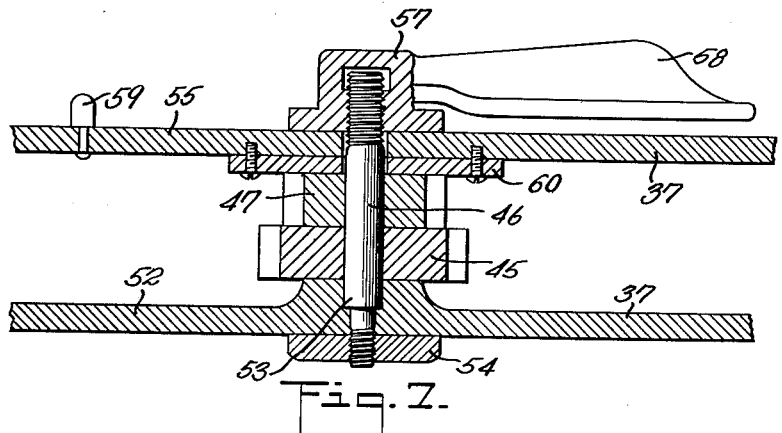
Figure 10:
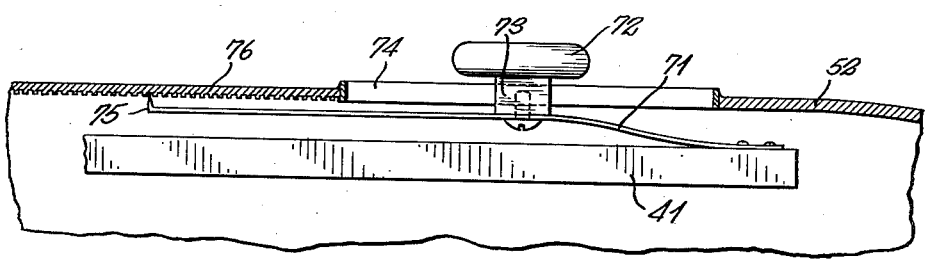

As shown in Figs. 6 and 7 the shaft 46 extends through one wall 52 of the casing 37 and is provided with a shoulder 53 which is received in a recess in the wall 52. The projecting end of the shaft is threaded to receive a clamping nut 54 which secures the shaft rigidly to the wall 52. The other end of the shaft extends freely through a hole in the opposite wall 55 of the casing and is threaded at 56 to receive a nut 57 having a thumb wing 58 whereby it may be rotated. The wing 58 is normally in abutment with a stop 59 mounted on the wall 55 and in this position the pinions 45 and 47 may rotate freely. When the nut is rotated by the wing 58 to the position shown in Fig. 10 the nut is threaded onto the shaft, 46, pressing the wall 55 toward the wall 52 and bringing a break pad 60 on the wall 55 into gripping contact with the pinion 47 and thus locking the pinions against rotation. This also locks the rod 48 in a position relative to the casing corresponding to the adjustment of the arm 42 from the arm 38. The gauge is thus set to measure the deflection of the tire under the load.

For this purpose a pointer arm 61 is pivotally mounted in the casing so that it may be swung outwardly to a fixed distance as, for example, horizontally, as shown in Fig. 3. In this position the distance from the end of the pointer to the bottom face of the foot 49 will be equal to a predetermined fraction of the distance between the arms 38 and 42. Inasmuch as this distance is not from the bottom of the tire but from the edge of the rim 39 to the face of the tread portion, it may be somewhat less than 85% as, for example, 83% or approximately five-sixths the distance. When the foot 49 is placed on the ground level with the tread of the tire and the end of the pointer 61 faces the rim 39 and with the casing extending vertically, the tire will be properly inflated when the end of the pointer is level with the outer edge of the rim 39. If the edge of the rim is below the end of the pointer 61 the tire is under inflated and more air is admitted until the edge of the rim is brought level with the end of the pointer. If, on the other hand, the rim is above the level of the pointer it is over inflated and some of the air is permitted to escape until the rim reaches the proper level.

The positions of the gauge in setting for any size of tire is shown, for example, in Fig. 4, and for testing the inflation required for a tire, is shown in Fig. 5. To obtain greater accuracy by maintaining the gauge in a vertical position, a spirit level 62 is provided in one side of the case. Preferably the arms 42, 38 and 61 are so pivoted that they may fold into the casing when not in use, the casing being provided with suitable slots for this purpose and notches 63, 64 and 65 to enable the arms to be grasped and swung outwardly for use.

Figure 8:
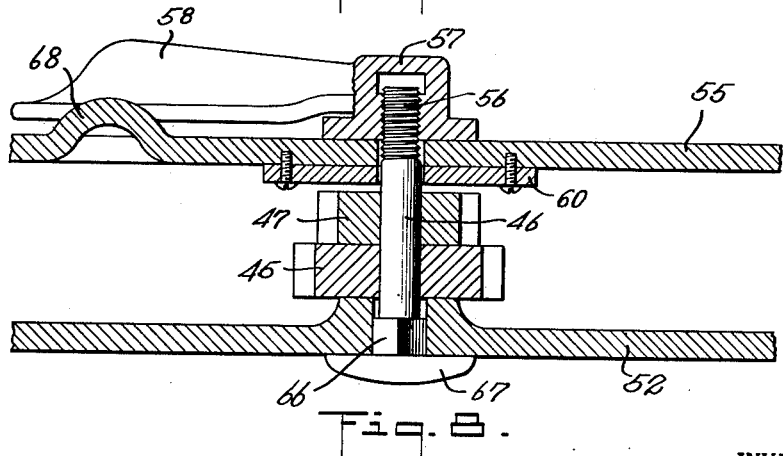
Figs. 8, 9 and 10 are sectional views of modified forms of locking mechanism.

It will be apparent that other arrangements of locking means may be employed as, for example, that shown in Fig. 8 in which, instead of having a nut 54 to lock the shaft 46 in position, a bolt having a squared portion 66 may be provided to fit into a squared hollow in the wall 52, the bolt being provided with a cap head 67. The arm of the shaft or bolt is as in Figs. 6, 7, except that the stop 59 may be provided by a protuberance 68 in the opposite wall 55 of the casing.

Figure 9:
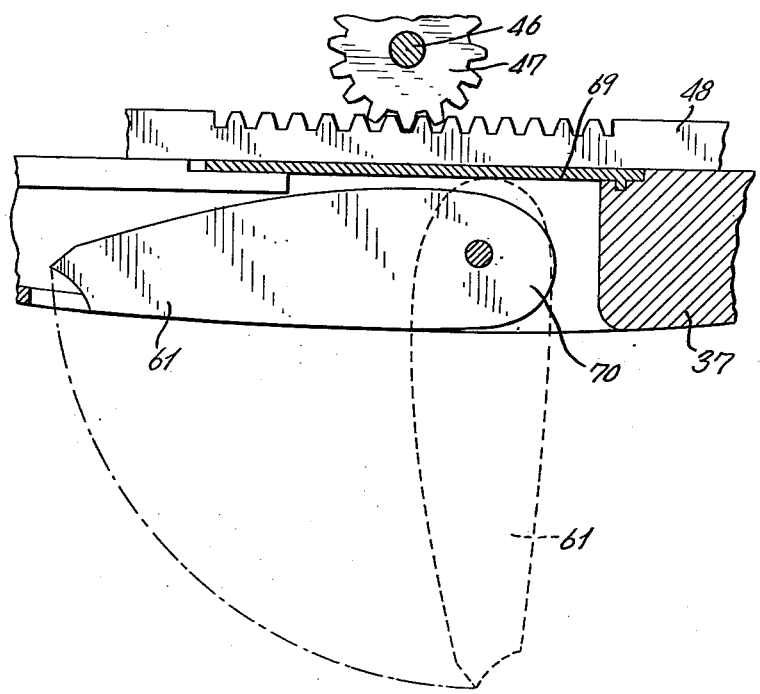

A different form of locking means is illustrated in Fig. 9 which shows a portion of the rack bar 48, pinion 47 and a wall of the casing 37 on a somewhat larger scale. In this embodiment the pinions and rack bars are locked in position by means of a friction strip 69 flexibly mounted on the wall of the casing 37 in position to be engaged and flex inwardly against the rack 48 by means of a cam end 70 on the inner end of the pointer arm 61.

The mechanisms are locked in position by the pressure of the friction strip 69 on the rack bar 48 when the pointer arm 61 is swung from the full line to the broken line position of Fig. 9, thus pressing the friction strip into contact with the rack bar.

In the embodiment of the invention shown in Figs. 10, 11, 12 and 13, the arrangement of the arms 38, 42 and 61 and of the rack bars 48 and 59 is similar to that of Figs. 1, 2 and 3.

For the convenient movement of the arm 42 a leaf spring 71 is mounted on the rack bar 41 to extend lengthwise therefrom and in spaced position therefrom. On this spring is mounted a knob 72 having a stem or neck 73 that extends through a slot 74 in the wall 52 of the casing so that it may be engaged and depressed by the thumb to slide the bar 41 to adjusted position. The free end of the spring 71 is bent outwardly as at 75 to engage a plate 76 having serrations into which the end of the spring fits when the knob 72 is released, thereby locking the rack bars and other mechanism in adjustable position.

Other transmissions may be employed in place of the differential pinions shown in the modifications of Figs. 1–13.

In Fig. 14 differential sprocket wheels and chains are employed. In the form illustrated in Fig. 14 one end of a chain 77 is secured to an ear 78 on the bar 41 and is then trained about a sprocket wheel 79 freely mounted on the shaft 46 and then secured at its opposite end to a spring 80 anchored as at 81 in the case of the gauge. The sprocket wheel 79 is keyed or secured to a smaller sprocket wheel 82 so that the two will rotate with the same angular velocity. Trained about the smaller sprocket wheel 82 is a sprocket chain 83, one end of which is secured to a spring 84 anchored to the case at 85, and the other end of which is secured to an ear 86 on the bar 48.

It will be apparent that when the bar 41 is lowered the sprocket wheels 79 and 82 will rotate counterclockwise drawing the bar 48 upwardly at a rate less than the proportion to the movement of the bar 41.

In the modification shown in Fig. 15 differential movement is transmitted from the bar 41 to the bar 48 by means of a slot lever 87 pivoted on the shaft 46. The opposite arms 88 and 89 of the lever 87 have longitudinal slots to receive pins 90 and 91 mounted on and projecting sidewise from the bars 41 and 48. The center of the pivot pin or shaft 46 is nearer the bar 48 than the bar 41, the relationship of the distances to the bars 48 and 41 being in the same proportion as the desired deflection under load to the undeflected parts of the tire.

As shown in Fig. 15 if the distance from the axis of the pivot pin 46 to the projecting pin 90 be represented as $x$, the distance from the center of the pivot pin 46 to the pin 91 will be a certain percentage of $x$, such as $0.83x$.

In the embodiment of the invention shown in Fig. 16 a rim engaging arm 92 is provided with an upright post 93 on which is slidably mounted a second arm 94 so that when the rim-engaging arm 92 is placed on the rim the adjusting arm may slide on the post 93 into engagement with the tread surface of the tire. The relative movement between the arms 92 and 94 is transmitted by means of cross-levers 95 and 96 pivoted on a common locking fulcrum pin 97 and engaging respectively at their opposite ends a foot 98 carrying an upright post 99 parallel to the post 93 and a sliding pointer 100 having a sidewise extension 101 to engage the rim of the tire when the foot 98 is on the ground level with the tire and the tire is inflated to the proper pressure. The arms of the levers 95 and 96 between the pivot and the arms 92 and 94 are somewhat longer than the other arms of the levers extending between the pivot pin 97 and the foot 98 and pointed arm 100 respectively. The relationship is such that the arms connecting with the foot 98 and pointer 100 will be approximately 83% of the length of the arms connected to the rim-engaging arm 92 and adjusting arm 94. Accordingly the distance between the bottom of the foot 98 and the arm 101 will be 83% of the distance between the rim-engaging arm 92 and the bottom of the arm 94.

In using this embodiment of the gauge the arm 92 is placed into engagement with the rim in the position shown in Fig. 4 and the arm 94 brought down into contact with the tread surface. The arms are then locked by the locking pin 97 and the gauge placed in the position shown in Fig. 5. The distance of the edge of the rim above or below the pointer arm 101 would indicate over or under inflation of the tire.

Through the above invention the condition of inflation of the tire may be very quickly and readily determined, it being necessary only to place the gauge adjusted to the tire size on a surface level with that on which the tire rests and observe the edge of the rim with the pointer arm. This will indicate whether the tire is properly inflated for the particular load to which it is subjected.

Having described my invention, what I claim is:

1. A tire gauge which comprises a casing having a projection to engage the rim of a wheel, an arm extending sidewise of said casing and movable toward and from said projection, a rod slidable in said casing having a foot portion outside of said casing, a differential transmission between said arm and said rod to move said rod at a lesser rate proportional to the rate of said arm, and a second projection in said casing to engage the rim of a wheel when said foot is placed on the ground.

2. The tire gauge of claim 1 in which said differential transmission comprises a pair of differential pinions, one meshing with said rack, and a rack attached to said arm and meshing with the other of said pinions.

3. The tire gauge of claim 1 having a locking means for locking said transmission against movement.

4. The tire gauge of claim 2 in which said projections comprise foldable arms on said casing.

5. The tire gauge of claim 2 having a spirit-level on said casing.

FRANKLIN O. CHURCH.

REFERENCES CITED

The following references are of record in the file of this patent:

UNITED STATES PATENTS

| Number | Name | Date |
|---|---|---|
| 618,888 | Linn | Feb. 7, 1899 |
| 794,031 | Lehman | July 4, 1905 |
| 1,263,229 | Gordon | Apr. 16, 1918 |
| 1,404,425 | Bartholdy | Jan. 24, 1922 |
| 2,339,031 | Rosenberg | Jan. 11, 1944 |
| 2,408,746 | Evert | Oct. 8, 1946 |
| 2,435,644 | Beckett et al. | Feb. 10, 1948 |

FOREIGN PATENTS

| Number | Country | Date |
|---|---|---|
| 529,473 | Great Britain | Nov. 21, 1940 |
| 865,932 | France | June 9, 1941 |